Figures 1, 2:
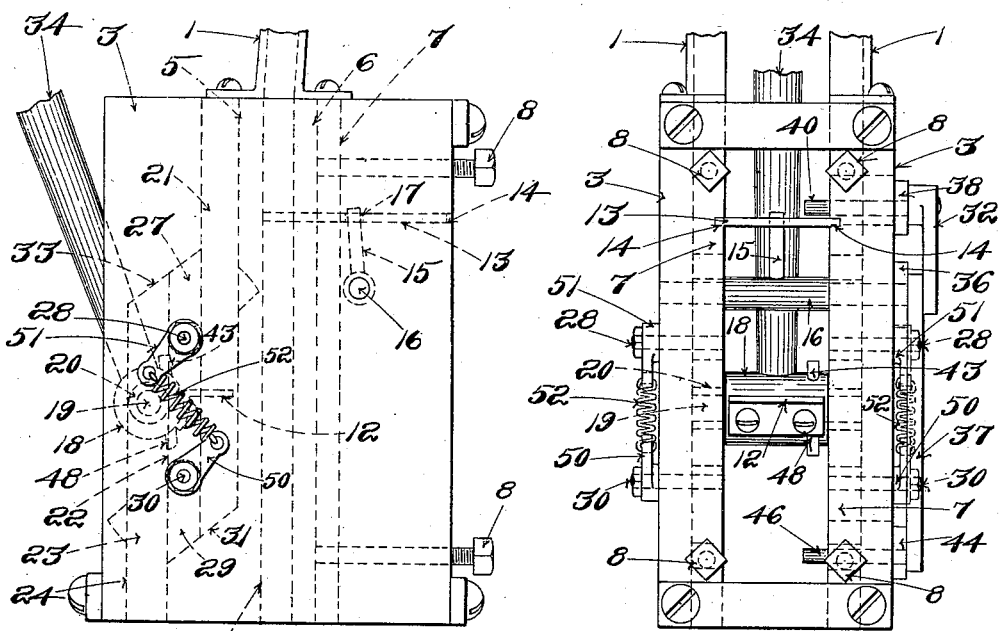

No. 886,091. PATENTED APR. 28, 1908.
S. S. TAINTER.
MACHINE FOR BOXING TOOTHPICKS.
APPLICATION FILED JAN. 28, 1907.

3 SHEETS—SHEET 1.

Witnesses:
John H. Parker
Alice Tarr

Inventor:
Simon S. Tainter
by Macleod Calver Copeland & Dike
Attorneys.

No. 886,091.　　　　　　　　　　　　　　　PATENTED APR. 28, 1908.
S. S. TAINTER.
MACHINE FOR BOXING TOOTHPICKS.
APPLICATION FILED JAN. 28, 1907.

3 SHEETS—SHEET 3.

Witnesses:
John H. Parker
Alice Tarr

Inventor:
Simon S. Tainter
by MacLeod Calver Copeland & Dike
Attorneys.

UNITED STATES PATENT OFFICE.

SIMON S. TAINTER, OF DIXFIELD, MAINE.

MACHINE FOR BOXING TOOTHPICKS.

No. 886,091.        Specification of Letters Patent.        Patented April 28, 1908.

Application filed January 28, 1907. Serial No. 354,490.

*To all whom it may concern:*

Be it known that I, SIMON S. TAINTER, citizen of the United States, residing at Dixfield, county of Oxford, State of Maine, have invented a certain new and useful Improvement in Machines for Boxing Toothpicks, of which the following is a specification, reference being had therein to the accompanying drawings.

This invention relates to an improvement in machines for boxing tooth picks and other small articles of somewhat similar shape.

Wooden tooth picks are usually put up and sold in small boxes containing from one hundred to five hundred tooth picks. These boxes have usually heretofore been filled by hand so far as known to me, and the expense of so doing is a relatively large item of expense in preparing the tooth picks for the market. In boxing the tooth picks, whether by hand or by machinery, it is important that a substantially uniform quantity of tooth picks shall be placed in each box of the same size. When the work is done by machine, it is, therefore, important that there should be some sort of measuring device by which a uniform supply shall be delivered to each box.

In an application filed November 17, 1906, Serial No. 343,899, wherein I was joint inventor, there is shown and described a machine for boxing tooth picks including mechanism for receiving the tooth picks in a mass and delivering them to other mechanism which is intended to measure out a uniform quantity of tooth picks and deliver them to the boxes successively as the boxes pass beneath the chute to which they are delivered from the measuring device.

The special object of the present invention is to provide an improved mechanism for receiving and measuring out the requisite number of picks for a box of any given size.

Inasmuch as the mechanism for conveying the tooth picks to the measuring device forms no part of the present invention, the conveying and delivering mechanism is not shown in the accompanying drawings. Any suitable mechanism for that purpose may be employed, as, for instance, the conveying mechanism shown and described in the application Serial No. 343,889 before mentioned.

The invention will be fully understood from the following description taken in connection with the accompanying drawings, and the novel features thereof are pointed out and clearly defined in the claims at the close of the specification.

Figure 3:
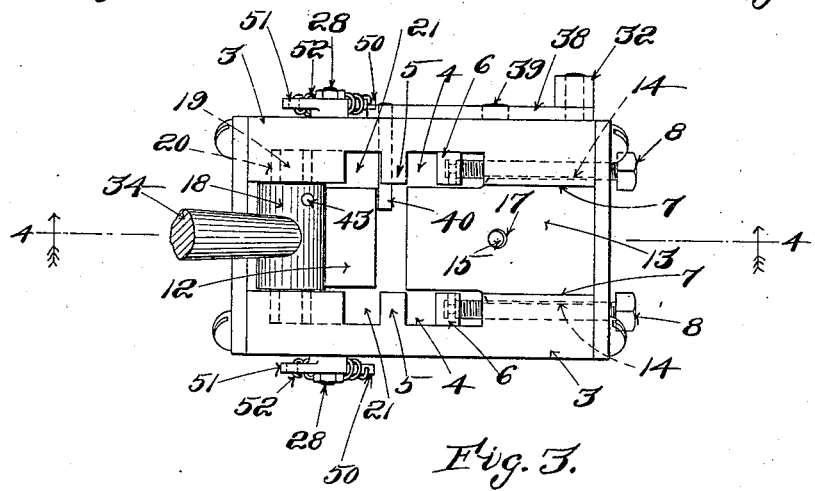
Figure 4:
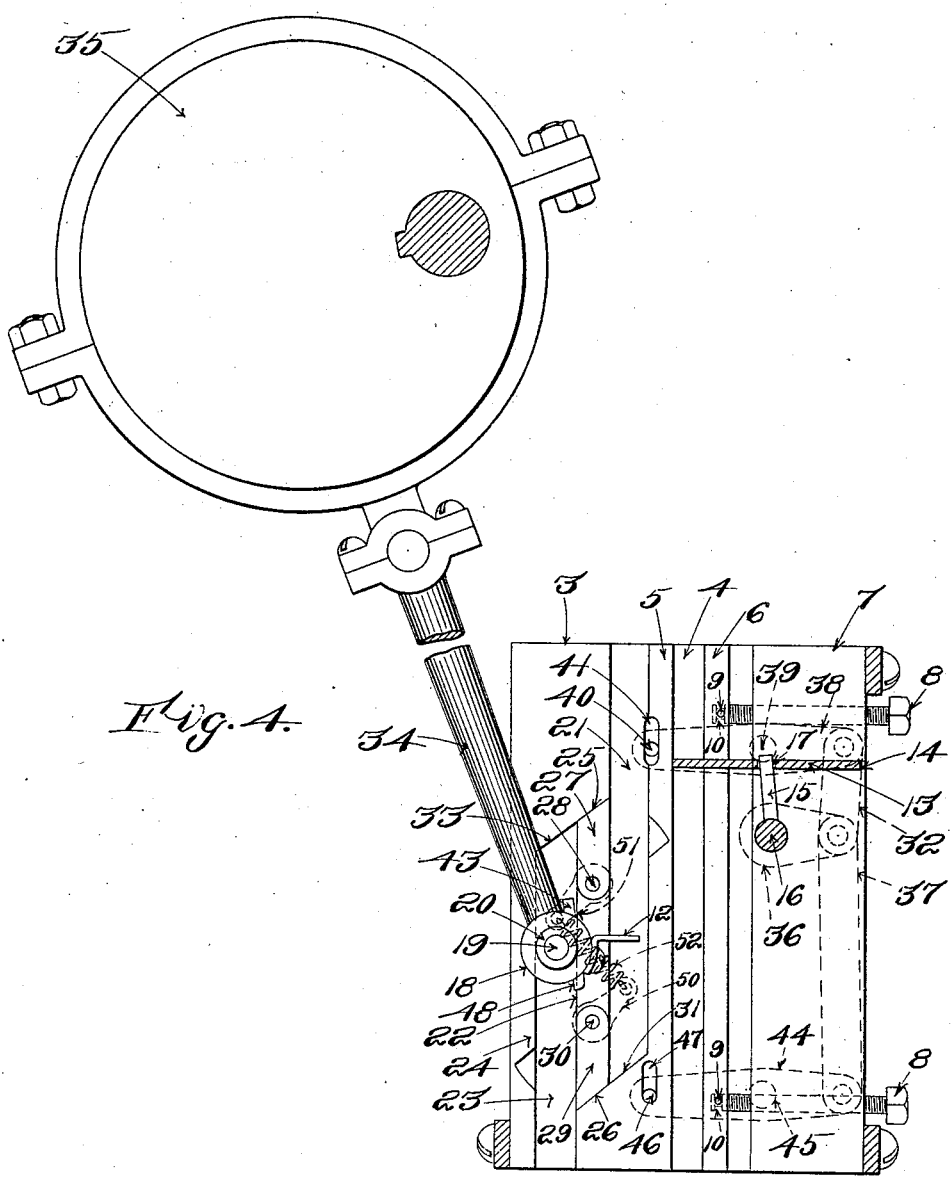
Figure 5:
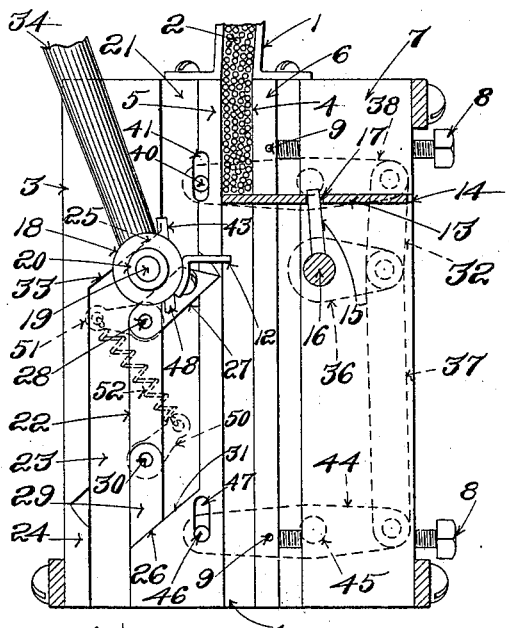
Figure 6:
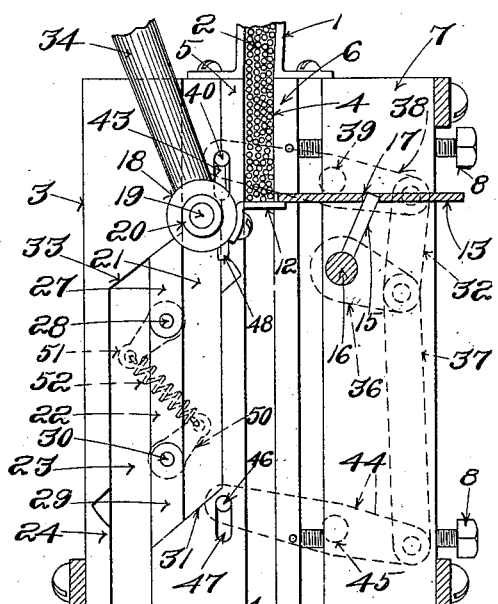
Figure 7:
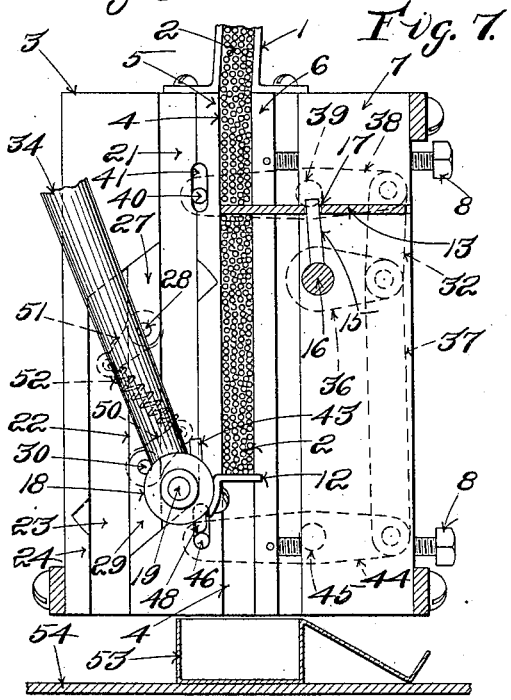
Figure 8:
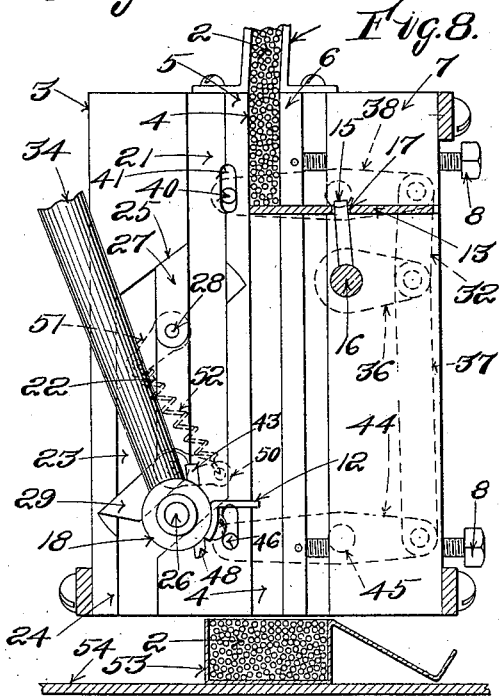

In the drawings,—Figure 1 is a front elevation of a machine embodying the invention. Fig. 2 is a side elevation viewed from the right in Fig. 1. Fig. 3 is a plan. Fig. 4 is a section on line 4—4 of Fig. 3 showing also an eccentric connection for operating the head which carries the movable bottom. Fig. 5 is a section on the same line as Fig. 4, showing the parts in the position in which the cut-off is holding back the column of tooth picks and the vertically movable bottom plate is about entering the upper end of the measuring conduit or chute for the tooth picks. Fig. 6 is a section on the same line as Fig. 5, showing the parts in the position where the movable bottom plate has moved into position transversely of the upper end of the measuring chute and has caused the cut-off to withdraw from the measuring chute, the column of tooth picks being now seated upon the movable bottom plate instead of on the cut-off. Fig. 7 is a similar section to Fig. 5, showing the movable bottom plate after it has descended to the bottom of the measuring chute and still supporting the column of tooth picks, and showing the cut-off moved crosswise of the upper end of the measuring chute to cut off the tooth picks already within the measuring chute from the column above, thus fixing the quantity of tooth picks which will be supplied to a single box. Fig. 8 is a similar section to Fig. 5, showing the position of the parts after the bottom plate has withdrawn from the lower end of the measuring chute and the tooth picks have dropped into the box, the cut-off still standing transversely of the upper end of the measuring chute to hold back the column of picks above.

Referring to the drawings,—1 represents a feed chute into which the tooth picks 2 are delivered by any suitable mechanism in even order lying parallel with each other, the width of the chute being slightly in excess of the length of the pick, so that they will be delivered in a horizontal position to the measuring mechanism, furnishing a continuous supply as fast as needed.

The measuring and filling mechanism will now be described. The vertical side plates 3, 3, are rigidly connected with each other and form the frame to which the other parts are connected.

Formed in the inner faces of the side plates 3 are grooved ways 4, 4, which receive the tooth picks from the delivering chute 1 and form a part of the measuring device. These grooved ways are formed by providing the inner face of each side plate 3 with vertical ribs 5, 6, the forward ribs 5 preferably being stationary and the rearward ribs 6 preferably being adjustable toward and from the fixed ribs 5 so as to vary the width of the conduit formed by the grooved ways 4 whereby the capacity of the measuring device may be varied. The plates 3, 3, should be spaced a distance apart slightly greater than the length of the tooth picks corresponding with the width of the chute 1.

At the rear of the adjustable ribs 6, 6, and projecting from the side plates 3, 3, are the two inwardly projecting flanges 7, 7, which serve as supports to which the adjustable ribs 6, 6, are secured by means of the adjusting screw bolts 8, 8. These bolts pass through tapped out holes in the flanges 7, 7, and are connected at their inner ends with the movable rib 6 in such manner as to permit rotation of the screw bolts 8 to move the rib 6 toward or from the supporting flange 7, and thereby to increase or diminish the distance from the fixed rib 5. As shown in the drawings, the manner of connecting the inner ends of the screw bolts 8 with the rib 6 is by means of pins 9 projecting from the rib 6 and engaging with a groove 10 in the periphery of the bolt 8. The particular form of connection, however, is not essential, it being merely important to have connection in such manner that the rib 6 may be moved toward and from the flange 7 as desired.

To form the bottom and top of the measuring device, there is provided a vertically reciprocable bottom 12 and a horizontally reciprocable cut-off 13 which is actuated to shut off the stream of tooth picks entering the measuring conduit formed by the ways 4 from the supply chute 1 when the reciprocable bottom 12 has reached the bottom of its downward stroke, the said cut-off 13 remaining in its forward position, as shown in Fig. 5, to restrain the further flow of picks until after the reciprocable bottom has been turned to dump the picks in the measuring device into the box beneath and has again returned to the uppermost position to receive a new supply for the next box. The mechanism which actuates the vertically reciprocable bottom 12 actuates also the horizontally reciprocable top or cut-off 13 so that the movements of the two can be properly timed with relation to each other. The cut-off 13 serves not only as a cut-off but also as a support for the mass of tooth picks in the chute above after the flow has been cut off. It reciprocates in transverse grooved ways 14 formed in the inner faces of the flanges 7. As shown in the drawings, it is engaged by a pin 15 projecting from the rockershaft 16 which engages with a slot 17 in the cut-off plate 13 so that as the rockershaft rocks back and forth, the cut-off plate will be reciprocated. The rockershaft 16 is actuated through connection with the mechanism which actuates the movable bottom 12 as will be hereinafter described. The movable bottom plate 12 extends laterally from a head 18 having axles 19 provided with cylindrical anti-friction roller bearings 20 which in the downward stroke of the bottom plate and head move in vertical ways 21 formed by the ribs 5 and 22. In the upward stroke the axles move in vertical guide ways 23 formed by the ribs 22 and 24. The ribs 22 which separate the two vertical guide ways 21 from the vertical ways 23 are each formed with diagonal slots 25, 26, connecting the ways 21 with the ways 23, the upper slots 25 forming ways for the axles 19 to pass from the vertical ways 23 to the vertical ways 21 on the upward stroke, and the lower slots 26 forming ways for the axles to pass from the vertical ways 21 to the vertical ways 23 in the downward stroke. The inclined ways 25 are normally closed by spring controlled latches 27 pivoted at their lower ends on arbors 28, the inclined upper end of the latches engaging with the inclined upper end of the slotted way 25 so that the latches can open only in one direction. The inclined ways 26 are normally closed by spring controlled latches 29 pivoted at their upper ends on arbors 30, the lower ends of the latches being inclined and engaged by the inclined ends of the ways 26 to prevent these latches also from being opened only in one direction. At the bottom of each vertical way 21 there is a stop 31 with an inclined face against which the axle rollers 20 of the head 18 strike in the downward descent. When the axle rollers 20 do strike the inclined surface 32, they are brought into engagement with the latches 29 and the further downward pressure of the axle and rollers 20 causes them to press against the spring controlled latches 29 and swing them open so that the axles will ride down the inclined ways 26 into the vertical way 23. In similar manner, on the upward stroke, when the axle rollers strike the inclined top 33 of the vertical way 23, they will be deflected and press open the swinging latch 27, allowing the axles to pass again into the vertical ways 21.

Any suitable mechanism may be employed for giving reciprocation to the head 18 so as to cause the axles to move through the vertical ways 21, 23, and the inclined connecting ways as above described, there being various well known forms of mechanism by which this can be done. An eccentric or well known form of crank may be employed, and this is a very desirable form for filling small boxes. It is not intended herein to limit the invention to any particular form of mechanism for producing this reciprocation. The mechanism shown in the drawings is an eccentric.

Connected with the head 18 is a rod 34 which, at its upper end, is connected with an eccentric 35, see Fig. 4, driven in any suitable manner, whereby the head 18 is given a reciprocating movement in the grooved ways.

Mounted on the end of rockershaft 16 on the outer face of the plate 3 is a rocker arm 36 which at its swinging end is pivoted to links 37 and 32, the upper end of said link 32 being pivoted to a rocking lever 38 fulcrumed at 39, the other end of said rocking lever 38 having a laterally projecting pin 40 which extends through an elongated slot 41 in the side plate 3 and passes through the upper portion of the vertical way 21. Said slot 41 limits the rocking movement of said lever 38. Said pin 40 is engaged by a pin 43 projecting from the head 18 on its upward stroke to rock said lever 38 on its fulcrum until the pin 40 strikes the upper end of the slot. This rocking movement of the lever 38 on the upward stroke of the head causes the descent of the link 37 and thereby turns the rocking arm 36 and the arbor 16 and through the pin 15 throws the cut-off plate 13 in the direction which opens the passage from the chute 1 to the vertical ways 4 of the tooth picks.

Pivoted to the lower end of the link 37 is one end of a rocking lever 44 fulcrumed intermediate its ends at 45 and having at its other end a pin 46 which extends through an elongated slot 47 in the side of the plate 3. Said slot 47 limits the movement of the pin 46 and the lever 44.

Projecting from the head 18 below the plate 12 is a pin 48 which, if desired, may be a continuation of the pin 43 passing through the head, which, in the downward stroke of the head, engages the pin 46, which will then be at the upper end of the elongated slot 47, and, as the axle rollers pass down the inclined slot 26, which leads from the vertical ways 21 to the vertical ways 23, it will force said pin 46 down to the lower end of the slot 47, thereby rocking the lever 44 on its fulcrum and moving upward the link 37, thereby turning the rocker arm 36 and the rockershaft 16 and thus through the pin 15 actuating the cut-off plate 13 in a direction to close the passage 4 as shown in Fig. 7.

Mounted on the arbor 30 is a rocker arm 50. Mounted on the arbor 28 is a rocker arm 51, the two rocker arms 50 and 51 being connected with each other by a spring 52, said spring serving to normally hold the rocker arms 50 and 51 in a position to retain the latches 27 and 29 in closed position and to restore them to closed position whenever either one of them has been opened by the axles 19 passing through the diagonal ways.

In the operation of the machine, the boxes will be presented one at a time beneath the tooth pick passageway 4 in any manner desired. One means of doing this is shown in Figs. 7 and 8, the boxes 53 being placed on a traveling belt 54 which will have an intermitting movement to bring the boxes successively into proper position to be filled. Preferably this conveyer belt should be controlled by the same mechanism which controls the movement of the eccentric 35 so that the movement will be timed in such manner as to bring a fresh box in position after a filled box is removed so as to have it ready in position as soon as the cut-off is open.

In the operation of the machine, assuming the cut-off to be closed and the axles 19 at the bottom of the grooved way 23, if the machine is then started, the eccentric will actuate the connecting rod 34 in such manner as to carry the axles 19 upward through the vertical ways 23, thence through the inclined ways 25 into the upper end of the vertical ways 21, bringing the pin 43 into engagement with the pin 40 which projects from the rocker lever 38, carrying it upward so as to rock the shaft 16 and open the cut-off 13. The movable bottom plate 12 will have extended across the tooth pick passageway 4 as soon as the axles 19 have come into the vertical ways 21 before the cut-off will have been opened. Therefore, as soon as the cut-off 13 has been opened, the tooth picks will be received upon the bottom plate 12. At the end of the upward stroke and as soon as the cut-off has been opened, the further movement of the eccentric will cause the descent of the head 18 and the plate 12, allowing the picks to drop down into the passageway 4 as fast as the bottom 12 descends, keeping the tooth pick passage filled to the top during the descent, and when the axles have reached the inclined stops at the bottom of the grooved ways 21, the tooth pick ways 4 will be filled to the top.

The further downward descent of the head 18 will, as already described, cause the axle rollers 20 to turn the latches 29 on their pivots and allow the axles to pass through the inclined ways into the vertical ways 23, thus withdrawing the bottom plate 12 from closing the bottom of the measuring conduit ways 4, but in the meantime the pin 48 projecting from the head 18 will have engaged the pin 46, turning the rocker lever 44, and by means of the mechanism already described will thereby throw the cut-off 13 to cut off the flow of picks from the top. During the upward movement of the head 18 and bottom plate by the continued movement of the eccentric the picks will have passed out through the now open bottom of the tooth pick way into the box beneath and before the cut-off is again open, a new box will be placed in position to receive the next supply of picks.

I claim as my invention:

1. In a box-filling machine, a conduit through which the articles are fed to the box, a movable seat for the articles which is adapted to move in the conduit from the entrance end to the discharge end and forms a seat for the articles during the passage through the conduit, means for cutting off the feed when the movable seat has reached the bottom of the conduit and means for withdrawing the said movable seat from the conduit after it has reached the discharge end.

2. In a box-filling machine, a conduit through which the articles are fed to the box, a movable seat for the articles which is adapted to move in the conduit from the entrance end to the discharge end and forms a seat for the articles during the passage through the conduit, means for cutting off the feed when the movable seat has reached the bottom of the conduit, means for moving said seat lengthwise of said conduit from the entrance end to the discharge end and withdrawing it from the conduit and returning it again into the conduit at the entrance end.

3. In a box-filling machine, a conduit through which the articles are fed to the box, a movable seat for the articles which is adapted to move in the conduit from the entrance end to the discharge end and forms a seat for the articles during the passage through the conduit, means for cutting off the feed when the movable seat has reached the bottom of the conduit, means for withdrawing the said movable seat from the conduit after it has reached the discharge end and means for varying the size of said conduit.

4. In a box-filling machine, a conduit through which the articles are fed to the box, a movable seat for the articles which is adapted to move in the conduit from the entrance end to the discharge end and forms a seat for the articles during the passage through the conduit, a cut-off for the feed and means for actuating said movable seat and said cut-off whereby the cut-off will shut off the supply before the discharge end is opened.

5. In a box-filling machine for tooth picks and similarly formed articles, a conduit whose width is slightly in excess of the articles which are to be boxed, a movable plate which extends transversely of said conduit and is adapted to receive the said articles at the entrance end of the conduit and prevents the articles from passing through the conduit except as the said plate moves, said conduit having a lateral opening in the lower part thereof for the withdrawal of said movable plate and having a lateral opening in the upper portion for the return of said movable plate into said conduit, a cut-off at the upper end of said conduit, means for moving said first mentioned plate longitudinally through said conduit and out through said lower lateral opening and returning it through said upper lateral opening into the upper end, said actuating mechanism also actuating the cut-off to cut off the supply before said first mentioned plate is withdrawn from the lower end of the conduit and which withdraws said cut-off after said first mentioned plate has been returned to its position across the upper end of said conduit.

6. In a machine for filling boxes, apparatus of the character described for supplying a measured quantity to each box, said apparatus comprising a measuring chute through which the articles to be boxed are conveyed, two movable plates adapted to extend crosswise of the passage in the chute, one of said plates being adapted to move in the chute lengthwise thereof from the entrance end to the outlet end and to support the mass of material which is to be measured, the other of said movable plates being movable transversely of the measuring chute to intermittently open and close the entrance, mechanism which moves said first mentioned plate through said chute from the entrance to the discharge end and then actuates the cut-off to close the passage at the entrance end, then moves said longitudinally movable plate to open the discharge end and returns it to the initial position transversely across the chute at the entrance end and withdraws the cut-off from the entrance end.

7. In a machine for boxing tooth picks and articles of similar form, two side plates having grooved guide ways on their inner faces, the bottoms of the grooves being spaced apart slightly in excess of the length of the articles to be boxed, said ways forming a conduit for the passage of the articles to be boxed, a head, a guide way for said head parallel to said tooth pick conduit through which said head moves downward, a plate extending from said head into and transversely of said tooth pick conduit and forming a seat for said articles in their passage through the conduit when the head moves downward, a second guide way for said head through which said head is adapted to travel in the reverse direction, inclined passages between said two guide ways at the upper and lower ends through which the head may pass from the lower end of said first guide way to the lower end of said second guide way and from the upper end of said second guide way back into the upper end of said first guide way, a cut-off plate which is reciprocable transversely of said conduit at the entrance end to open and close the same, mechanism which actuates said head down through one guide way and thereby moves the plate attached thereto from the entrance to the exit end of the said tooth pick conduit and then moves said head into said second guide way and returns it through said second guide way back into the first guide way to project said plate carried by the head crosswise of said tooth pick conduit at the upper end, mechanism for actuating the cut-off, mechanism actuated by said head actuating mechanism to control the movement of the cut-off actuating mechanism to close said entrance end before the lower end is opened and to withdraw from said entrance end after said plate carried by the head is returned to its transverse position at the upper end of said tooth pick conduit.

8. In a machine for boxing tooth picks and articles of similar form, two side plates having grooved guide ways on their inner faces, the bottoms of the grooves being spaced apart slightly in excess of the length of the articles to be boxed, said ways forming a conduit for the passage of the articles to be boxed, a head, a guide way for said head parallel to said tooth pick conduit through which said head moves downward, a plate extending from said head into and transversely of said tooth pick conduit and forming a seat for said articles in their passage through the conduit when the head moves downward, a second guide way for said head through which said head is adapted to travel in the reverse direction, inclined passages between said two guide ways for the head through which it may pass from the lower end of said first guide way to the lower end of said second guide way and from the upper end of said second guide way back into the upper end of said first guide way, a cut-off plate which is reciprocable transversely of said conduit at the entrance end to open and close the same, mechanism which actuates said head down through one guide way and thereby moves the plate attached thereto from the entrance to the exit end of the tooth pick conduit and then moves said head into said second guide way and returns it through said second guide way back into the first guide way to project said plate carried by the head crosswise of said conduit at the upper end, mechanism for actuating the cut off, mechanism actuated by said head actuating mechanism to control the movement of the cut-off actuating mechanism to close said entrance end before the lower end is opened and to withdraw from said entrance end after said plate carried by the head is returned to its transverse position at the upper end of said conduit, and spring controlled latches which normally close the passages between the two longitudinal guide ways in which said head travels.

9. In a machine for boxing tooth picks and articles of similar form, two side plates spaced apart slightly in excess of the length of the articles to be boxed, parallel ribs on the inner faces of said plates forming a measuring way, a movable plate which is adapted to extend transversely of said measuring way, a head which carries said plate, two sets of guide ways parallel with said measuring way within which said head is adapted to travel, inclined passages between said two sets of guide ways through which said plate carrying head may be moved from one set of ways to the other set of ways, means for reciprocating said plate carrying head, whereby it may be moved downward through one set of ways, thence into said second set of ways, thence up through said second set of ways and back into the first set of ways, a cut-off plate which is reciprocable transversely of said measuring way at the entrance end and mechanism which is actuated by the plate carrying head to reciprocate said cut-off to close the passage at the end of the downward stroke and open it at the end of the upward stroke of the head.

10. In a machine for boxing tooth picks and articles of similar form, two side plates spaced apart slightly in excess of the length of the articles to be boxed, parallel ribs on the inner faces of said plates forming a measuring way, a movable plate which is adapted to extend transversely of said measuring way, a head which carries said plate, two sets of guide ways parallel with said measuring way within which said head is adapted to travel, inclined passages between said two sets of guide ways through which said plate carrying head may be moved from one set of ways to the other set of ways, cylindrical anti-friction bearings for said head, means for reciprocating said plate carrying head, whereby it may be moved downward through one set of ways, thence into said second set of ways, thence up through said second set of ways and back into the first set of ways, a cut-off plate which is reciprocable transversely of said measuring way at the entrance end and mechanism which is actuated by the plate carrying head to reciprocate said cut-off to close the passages at the end of the downward stroke and open it at the end of the upward stroke of the head.

11. In a machine for boxing tooth picks and articles of similar form, two side plates spaced apart slightly in excess of the length of the articles to be boxed, parallel ribs on the inner faces of said plates forming a measuring way, a movable plate which is adapted to extend transversely of said measuring way, a head which carries said plate, two sets of guide ways parallel with said measuring way within which said head is adapted to travel, inclined passages between said two sets of ways through which said plate carrying head may be moved from one set of ways to the other set of ways, an eccentric and a rod connected therewith and with said plate carrying head, whereby said head may be moved downward through one set of ways, thence into said second set of ways, thence up through said second set of ways and back into the first set of ways, a cut-off plate which is reciprocable transversely of said measuring way at the entrance end and mechanism which is actuated by the plate carrying head to reciprocate said cut-off to close the passage at the end of the downward stroke and open it at the end of the upward stroke of the head.

12. In a box filling machine, a measuring chute through which the articles are fed to the box, said measuring chute having adjustable sides, whereby the width of the chute may be varied, a movable seat for the articles which is adapted to move in said chute from the entrance end to the discharge end and forms a seat for the articles during the passage through the chute, and means for cutting off the feed when the movable seat has reached the discharge end of the chute.

13. In a box filling machine, a measuring conduit through which the articles are fed to the box, two movable end closing members for said measuring conduit, one of which is movable transversely of the entrance end of the conduit and the other of which is movable through the conduit from the entrance end to the discharge end and thence out of the conduit, means for actuating said movable end closing members and means for controlling the actuating mechanism whereby the entrance end will be closed before the discharge end is opened.

14. In a box filling machine, a measuring conduit through which the articles are fed to the box, two movable end closing members for said measuring conduit, one of which is movable transversely of the entrance end of the conduit and the other of which is movable through the conduit from the entrance end to the discharge end and thence out of the conduit, means for actuating said movable end closing members, and means for controlling said actuating mechanism whereby the entrance end will be closed before the discharge end is opened and whereby the discharge end will then be opened and again closed before the entrance end is opened and the entrance end will then be opened while the discharge end is closed.

15. In a box filling machine, a measuring conduit through which the articles are fed to the box, two movable end closing members one of which is movable laterally to open and close the entrance end, the other of which is movable longitudinally of the conduit from near the entrance end to the discharge end and thence laterally to open the discharge end, means for actuating said movable end closing members and means for controlling their sequence of movements whereby the second of said end-closing members moves longitudinally within the conduit toward the discharge end while the entrance end is open, then the entrance closing member moves laterally to close the entrance, then the longitudinally movable end closing member moves successively to open the discharge end, and moves back to close the conduit below the entrance closing member while the entrance is still closed, then the entrance closing member moves to open the entrance end.

In testimony whereof I affix my signature, in presence of two witnesses.

SIMON S. TAINTER.

Witnesses:
WILLIAM A. MACLEOD,
ALICE H. MORRISON.